United States Patent
Briff et al.

(10) Patent No.: US 11,728,744 B2
(45) Date of Patent: Aug. 15, 2023

(54) VOLTAGE SOURCE CONVERTER FOR USE IN POWER TRANSMISSION NETWORKS

(71) Applicant: General Electric Technology GmbH, Baden (CH)

(72) Inventors: Pablo Ariel Briff, Stafford (GB); Huy Quoc Si Dang, Stafford (GB); Richard S. Zhang, Stafford (GB); Guillaume De Preville, Massy (FR); Stéphane Pierre Brehaut, Massy (FR); Omar Jasim, Stafford (GB)

(73) Assignee: General Electric Technology GmbH, Baden (CH)

( * ) Notice: Subject to any disclaimer, the term of this patent is extended or adjusted under 35 U.S.C. 154(b) by 185 days.

(21) Appl. No.: 17/270,814

(22) PCT Filed: Aug. 19, 2019

(86) PCT No.: PCT/EP2019/072107
§ 371 (c)(1),
(2) Date: Feb. 23, 2021

(87) PCT Pub. No.: WO2020/038870
PCT Pub. Date: Feb. 27, 2020

(65) Prior Publication Data
US 2021/0249969 A1 Aug. 12, 2021

(30) Foreign Application Priority Data
Aug. 24, 2018 (EP) .................................... 18190658

(51) Int. Cl.
*H02M 7/483* (2007.01)
*H02M 1/42* (2007.01)
*H02M 1/32* (2007.01)

(52) U.S. Cl.
CPC ............. *H02M 7/483* (2013.01); *H02M 1/32* (2013.01); *H02M 1/42* (2013.01); *H02M 7/4835* (2021.05)

(58) Field of Classification Search
CPC .......... H02M 7/483; H02M 1/32; H02M 1/42; H02M 7/4835; H02M 1/0012
See application file for complete search history.

(56) References Cited

U.S. PATENT DOCUMENTS 10,615,714 B2 * 4/2020 Shinoda ................ H02M 7/483
11,211,878 B2 * 12/2021 Biris ..................... H02M 5/458
(Continued)

FOREIGN PATENT DOCUMENTS

EP    2 884 653 A1    6/2015
EP    2 988 406 A1    2/2016
(Continued)

OTHER PUBLICATIONS

Search Report & Written Opinion issued in PCT/EP2019/072107, dated Oct. 21, 2019, 22 pages.
(Continued)

*Primary Examiner* — Yusef A Ahmed
(74) *Attorney, Agent, or Firm* — Eversheds Sutherland (US) LLP

(57) ABSTRACT

A voltage source converter having first and second DC terminals for connection to a DC network is provided. The voltage source converter includes at least one converter limb that extends between the first and second DC terminals and first and second limb portions that are separated by a respective AC terminal for connection to a corresponding phase of an AC network. Each limb portion includes a chain-link converter which is defined by a plurality of series-connected switching modules which operate in combination to provide a stepped variable voltage source. The
(Continued)

voltage source converter includes a control apparatus configured to coordinate operation of the chain-link converters to cause an exchange of power between the DC and AC networks, evaluate the performance of one of the pluralities of series-connected switching modules, and modify the operation of the respective chain-link converter when the performance becomes degraded to a predetermined amount.

11 Claims, 2 Drawing Sheets

(56) References Cited

U.S. PATENT DOCUMENTS

| | | | | |
|---|---|---|---|---|
| 11,277,076 | B2* | 3/2022 | Dallmer-Zerbe ... | H02M 7/4833 |
| 2012/0314466 | A1* | 12/2012 | Goerges ............ | H02M 7/53873 |
| | | | | 363/78 |
| 2013/0208519 | A1* | 8/2013 | Yamamoto .......... | H02M 7/4835 |
| | | | | 363/67 |
| 2013/0208521 | A1* | 8/2013 | Trainer ................ | H02M 7/797 |
| | | | | 363/126 |
| 2013/0279211 | A1* | 10/2013 | Green .................. | H02J 3/1814 |
| | | | | 363/35 |
| 2014/0369096 | A1* | 12/2014 | Hosokawa ............ | H02M 7/49 |
| | | | | 363/68 |
| 2015/0171726 | A1* | 6/2015 | Singh Riar ......... | H02M 7/4835 |
| | | | | 363/65 |
| 2015/0171769 | A1* | 6/2015 | Geyer ................. | H02H 7/1227 |
| | | | | 363/71 |
| 2016/0241127 | A1* | 8/2016 | Jasim ..................... | H02M 1/12 |
| 2016/0248341 | A1* | 8/2016 | Trainer ............... | H02M 7/4835 |
| 2016/0308466 | A1* | 10/2016 | Oates ................ | H02M 7/4835 |
| 2016/0352239 | A1* | 12/2016 | Trainer ............... | H02M 7/4835 |
| 2017/0063255 | A1* | 3/2017 | Jasim ................... | H02M 7/217 |
| 2017/0294853 | A1* | 10/2017 | Flannery .............. | H02M 7/483 |
| 2018/0069469 | A1* | 3/2018 | Gupta ................... | H02M 1/32 |
| 2018/0175744 | A1* | 6/2018 | Jasim ................... | H02M 1/14 |
| 2019/0305669 | A1* | 10/2019 | Gupta .................. | G01R 27/18 |
| 2019/0372478 | A1* | 12/2019 | Trainer ................ | H02M 7/483 |
| 2020/0127583 | A1* | 4/2020 | Adachi ................. | H02M 7/49 |
| 2020/0195165 | A1* | 6/2020 | Shinoda .............. | H02M 1/4208 |
| 2020/0201953 | A1* | 6/2020 | Shi ........................ | G06F 30/367 |
| 2020/0209904 | A1* | 7/2020 | Adamczyk ......... | H02M 7/53871 |
| 2021/0135453 | A1* | 5/2021 | Udalagama ........ | H02J 3/0012 |
| 2021/0408937 | A1* | 12/2021 | Bhattacharya ...... | H02M 7/4833 |

FOREIGN PATENT DOCUMENTS

| | | |
|---|---|---|
| WO | 2010/102666 A1 | 9/2010 |
| WO | 2014/006200 A1 | 1/2014 |

OTHER PUBLICATIONS

Nami et al., "Modular Multilevel Converters for HVDC Applications: Review on Converter Cells and Functionalities," IEEE Transactions on Power Electronics, vol. 30, No. 1, Jan. 2015, 19 pages.

* cited by examiner

VOLTAGE SOURCE CONVERTER FOR USE IN POWER TRANSMISSION NETWORKS

CROSS-REFERENCE TO RELATED APPLICATIONS

This application is a U.S. National Stage Application under 35 U.S.C. 371 and claims the priority benefit of International Application No. PCT/EP2019/072107, filed Aug. 19, 2019, which claims priority to European Application No. 18190658.7, filed Aug. 24, 2018, which are both incorporated herein by reference.

This invention relates to a voltage source converter and to a method of operating a voltage source converter, preferably for use in high voltage direct current (HVDC) transmission.

In HVDC power transmission networks alternating current (AC) power is typically converted to direct current (DC) power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance.

The conversion between DC power and AC power is utilized in power transmission networks where it is necessary to interconnect the DC and AC networks. In any such power transmission network, converters are required at each interface between AC and DC power to effect the required conversion from AC to DC or from DC to AC. Such converters may employ voltage source converters to perform power conversion.

According to a first aspect of the invention there is provided a voltage source converter comprising:
first and second DC terminals for connection to a DC network;
at least one converter limb, the or each converter limb extending between the first and second DC terminals and including first and second limb portions separated by a respective AC terminal for connection to a corresponding phase of an AC network, each first limb portion extending between the first DC terminal and corresponding AC terminal, each second limb portion extending between the second DC terminal and corresponding AC terminal, each limb portion including a respective chain-link converter defined by a plurality of series-connected switching modules operable in combination to provide a stepped variable voltage source; and
a control apparatus configured to coordinate operation of the chain-link converters to cause an exchange of power between the DC and AC networks, the control apparatus evaluating the combined performance of the switching modules within at least one chain-link converter and acting to modify the coordinated operation of the chain-link converters when the combined performance of the said switching modules becomes degraded to a predetermined extent.

The inclusion of such a control apparatus within the voltage source converter of the invention desirably permits the continued transfer of power, both active and reactive, under conditions in which the performance of one or more switching modules within a given chain-link converter has become degraded, e.g. because of a sudden failure or ageing, which in turn provides for increased voltage source converter availability and reduced converter outage time, e.g. between scheduled maintenance periods.

Optionally the control apparatus modifies the coordinated operation of the chain-link converters when the combined performance of the switching modules within at least one chain-link converter becomes degraded to a predetermined extent by varying the active and/or reactive power transfer demands made of the voltage source converter.

Preferably the control apparatus modifies the coordinated operation of the chain-link converters by limiting the active and/or reactive power transfer demands made of the voltage source converter.

The inclusion of a control apparatus having the foregoing features helps to ensure that the voltage source converter is able to continue operating in a stable manner, despite the degraded performance of one or more switching modules.

The control apparatus may include:
a high-level controller programmed to receive active and/or reactive power transfer demands that the voltage source converter is required to provide, and to establish a respective chain-link reference voltage for each chain-link converter that each respective chain-link converter is required to produce in order that coordinated operation of the chain-link converters causes the demanded power transfer between the DC and AC networks;
at least one low-level controller programmed to control the operation of each switching module within at least one chain-link converter, whereby the said chain-link converter aims to provide a stepped variable voltage source equal to the corresponding required chain-link reference voltage; and
an evaluation module configured to receive switching module performance information and programmed to evaluate the performance information to establish when the combined performance of the switching modules within the at least one chain-link converter has become degraded to a predetermined extent.

In a preferred embodiment of the invention the evaluation module is programmed to instruct the high-level controller to modify the coordinated operation of the chain-link converters when the evaluation module establishes that the combined performance of the switching modules within the at least one chain-link converter has become degraded to a predetermined extent.

Having a control apparatus configured as described hereinabove is advantageous because it separates out different aspects of the overall control of the voltage source converter in a manner that allows each to be optimised in terms of speed and efficiency.

Preferably the evaluation module is programmed to instruct the high-level controller to operate the voltage source converter in a degraded mode in which the high-level controller limits the active and/or reactive power transfer demands made of the voltage source converter in order that the coordinated operation of the chain-link converters is modified.

Having the voltage source converter operate in a degraded mode is desirable since it allows for the continued transfer of power by the voltage source converter on a temporary or long-term basis, depending on the severity of switching module degradation, until a subsequent maintenance period offers an opportunity to reinstate the full power transfer capability of the voltage source converter.

Optionally the high-level controller limits the active and/or reactive power transfer demands by one of:
reducing the active real and/or reactive power transfer demand; and reducing a current reference demand resulting from the active and/or reactive power transfer demand.

Such steps can be readily implemented in a practicable manner.

In a further preferred embodiment of the invention the evaluation module is programmed to evaluate the performance information for the switching modules within a given chain-link converter by comparing the respective chain-link reference voltage the given chain-link converter is required to produce with the actual stepped variable voltage source provided by the said given chain-link converter, and to establish that the combined performance of the switching modules within the given chain-link converter has become degraded to a predetermined extent when the actual stepped variable voltage source provided falls short of the corresponding chain-link reference voltage by more than a predetermined amount.

Comparing the respective chain-link reference voltage with the actual stepped variable voltage source provided, which may be estimated or calculated based on individual switching module voltage measurements and their switching state, provides a reliable and readily implementable way of establishing when an undesired degree of switching module degradation has occurred, which then allows for the overall operation of the voltage source converter to be modified accordingly.

According to a second aspect of the invention there is provided a method of operating a voltage source converter, the voltage source converter comprising:

first and second DC terminals for connection to a DC network;

at least one converter limb, the or each converter limb extending between the first and second DC terminals and including first and second limb portions separated by a respective AC terminal for connection to a corresponding phase of an AC network, each first limb portion extending between the first DC terminal and corresponding AC terminal, each second limb portion extending between the second DC terminal and corresponding AC terminal, each limb portion including a respective chain-link converter defined by a plurality of series-connected switching modules operable in combination to provide a stepped variable voltage source, wherein the method comprises the steps of:

coordinating operation of the chain-link converters to cause an exchange of power between the DC and AC networks;

evaluating the combined performance of the switching modules within at least one chain-link converter; and acting to modify the coordinated operation of the chain-link converters when the combined performance of the said switching modules becomes degraded to a predetermined extent.

The method may include the step of modifying the coordinated operation of the chain-link converters when the combined performance of the switching modules within at least one chain-link converter becomes degraded to a predetermined extent by varying the active and/or reactive power transfer demands made of the voltage source converter.

The method may include the step of modifying the coordinated operation of the chain-link converters by limiting the active and/or reactive power transfer demands made of the voltage source converter.

The method may include the steps of:

receiving active and/or reactive power transfer demands that the voltage source converter is required to provide;

establishing a respective chain-link reference voltage for each chain-link converter that each respective chain-link converter is required to produce in order that coordinated operation of the chain-link converters causes the demanded power transfer between the DC and AC networks;

controlling the operation of each switching module within at least one chain-link converter, whereby the said chain-link converter aims to provide a stepped variable voltage source equal to the corresponding required chain-link reference voltage; and receiving switching module performance information and evaluating the performance information to establish when the combined performance of the switching modules within the at least one chain-link converter has become degraded to a predetermined extent.

The method may include the step of modifying the coordinated operation of the chain-link converters when it is established that the combined performance of the switching modules within the at least one chain-link converter has become degraded to a predetermined extent.

The method may include the step of operating the voltage source converter in a degraded mode in which the active and/or reactive power transfer demands made of the voltage source converter are limited in order that the coordinated operation of the chain-link converters is modified.

Optionally the method may further include the step of limiting the active and/or reactive power transfer demands by one of:

reducing the active real and/or reactive power transfer demand; and reducing a current reference demand resulting from the active and/or reactive power transfer demand.

The method may include the steps of evaluating the performance information for the switching modules within a given chain-link converter by comparing the respective chain-link reference voltage the given chain-link converter is required to produce with the actual stepped variable voltage source provided by the said given chain-link converter, and establishing that the combined performance of the switching modules within the given chain-link converter has become degraded to a predetermined extent when the actual stepped variable voltage source provided falls short of the corresponding chain-link reference voltage by more than a predetermined amount.

The advantages of the voltage source converter of the first aspect of the invention and its embodiments apply mutatis mutandis to the method of the second aspect of the invention and its embodiments.

There now follows a brief description of preferred embodiment of the invention, by way of non-limiting example, with reference being made to the following figures in which.

The figures are not necessarily to scale, and certain features or figures may be shown exaggerated in scale or in schematic form in the interests of clarity and conciseness.

The following embodiment of the invention is used primarily in HVDC applications, but it will be appreciated that embodiments of the invention may be applicable to other applications operating at different voltage levels.

Figure 1:
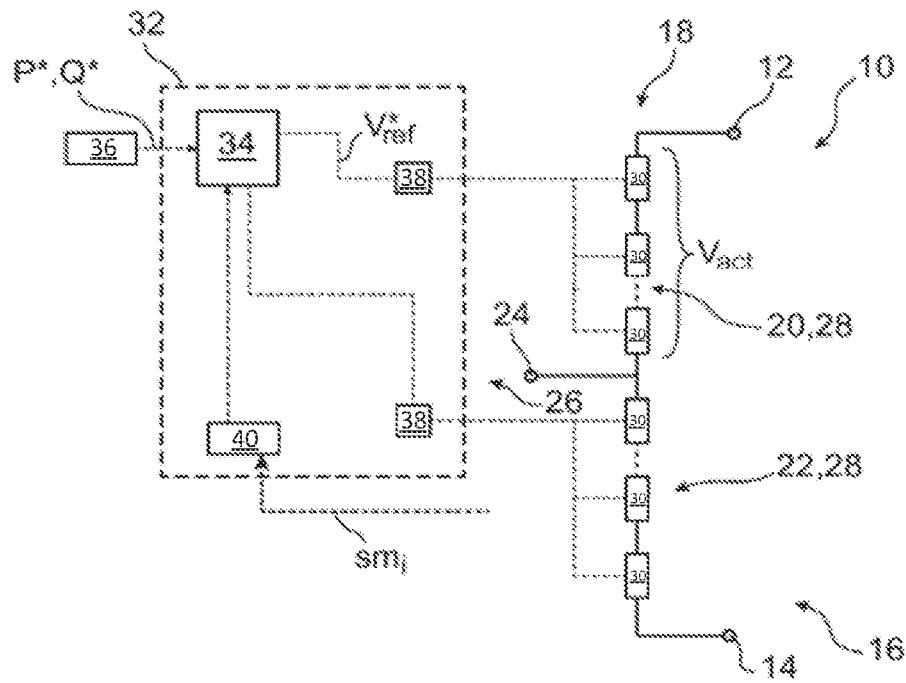
FIG. 1 shows a schematic view of a voltage source converter according to an embodiment of the invention.

A voltage source converter according to an embodiment of the invention is shown in FIG. 1 and is designated generally by the reference numeral 10.

The voltage source converter 10 includes first and second DC terminals 12, 14 which, in use, are connected to a DC network 16.

The voltage source converter 10 also includes three converter limbs 18, only one of which is shown in FIG. 1. Each converter limb 18 extends between the first and second DC terminals 12, 14 and includes first and second limb portions 20, 22 which are separated by a respective AC terminal 24, again only one of which is shown in FIG. 1. The AC terminals 24 are, in use, connected to a corresponding phase of a three-phase AC network 26.

In other embodiments of the invention (not shown) the voltage source converter may include fewer than or more than three converter limbs, the actual number of converter limbs corresponding to the number of phases within an associated AC network that the voltage source converter is intended, in use, to be connected with.

Each first limb portion 20 extends between the first DC terminal 12 and the corresponding AC terminal 24, while each second limb portion 22 extends between the second DC terminal 14 and the corresponding AC terminal 24.

Each limb portion 20, 22 includes a respective chain link converter 28 that is defined by a plurality of series-connected switching modules 30. Each switching module 30 includes a number of switching elements (not shown) that are connected in parallel with an energy storage device in the form of a capacitor (not shown). Each switching element includes a semiconductor device in the form of, e.g. an Insulated Gate Bipolar Transistor (IGBT), which is connected in parallel with an anti-parallel diode. It is, however, possible to use other semiconductor devices.

More particularly, in the embodiment shown each chain-link converter 28 is defined by a plurality of series-connected switching modules 30 of a first type in which first and second pairs of switching elements and a capacitor are connected in a known full bridge arrangement to define a 4-quadrant bipolar module. Switching of the switching elements selectively inserts or bypasses the capacitor into the corresponding limb portion, i.e. selectively directs current through the capacitor or causes current to bypass the capacitor, such that the first type of switching module 30 can provide zero, positive or negative voltage and can conduct current in two directions.

A second type of switching module is one in which only a first pair of switching elements is connected in parallel with a capacitor in a known half-bridge arrangement to define a 2-quadrant unipolar module. In a similar manner to the first type of switching module 30, switching of the switching elements again inserts or bypasses the capacitor into the corresponding limb portion, i.e. selectively directs current through the capacitor or causes current to bypass the capacitor, such that the second type of switching module can provide zero or positive voltage and can conduct current in two directions.

In other embodiments of the invention, one or more chain-link converters may be made up entirely of the second type of switching module, or of a combination of first and second types of switching module.

In any event, by virtue of selectively inserting or bypassing the energy storage device (i.e. the corresponding capacitor) of each switching module 30 into a corresponding limb portion to thereby control a voltage across each individual switching module 30, it is possible to build up a combined voltage across each chain-link converter 28 by combining the individual voltage available from each switching module 30.

Accordingly, the switching modules 30 of a respective chain-link converter 28 are operable in combination to provide a stepped variable voltage source.

In addition to the foregoing, the voltage source converter 10 of the invention includes a control apparatus 32 which is configured to coordinate operation of the chain-link converters to cause an exchange of power between the DC and AC networks (16, 26).

More particularly, the control apparatus 32 includes a high-level controller 34 that is programmed to receive active and reactive power transfer demands P*, Q* that the voltage source converter 10 is required to provide. In the embodiment shown, the high-level controller 34 receives the active and reactive power demands P. Q from a human machine interface 36, although this need not necessarily be the case. Furthermore, in other embodiments of the invention the high-level controller may receive only one of an active power transfer demand or a reactive power transfer demand.

In any event, however, the high-level controller 34 is further programmed to establish a respective chain-link reference voltage $v^*_{ref}$ for each chain-link converter 28 that each respective chain-link converter 28 is required to produce in order that coordinated operation of the chain-link converters 28 causes the demanded power transfer between the DC and AC networks 16, 26.

In addition to the foregoing, the control apparatus 32 includes six low-level controllers 38, only two of which are shown in FIG. 1. Each low-level controller 38 is programmed to control the operation of each switching module 30 within a corresponding single chain-link converter 28, whereby the said corresponding single chain-link converter 28 aims to provide a stepped variable voltage source $v_{act}$ equal to the corresponding required chain-link reference voltage $v^*_{ref}$.

In other embodiments of the invention (not shown) one or more low-level controllers may be programmed to control the switching of switching elements within the switching modules of more than one chain-link converter.

The control apparatus 32 is additionally configured to evaluate the combined performance of the switching modules 30 within each chain-link converter 28, although in some other embodiments it may not be each chain-link converter, and to modify the coordinated operation of the chain-link converters 28 when the combined performance of the switching modules 30 within a given chain-link converter becomes degraded to a predetermined extent.

In particular, the control apparatus 32 modifies the coordinated operation of the chain-link converters 28 by varying the active and reactive power transfer demands P*, Q* made of the voltage source converter 10, and more particularly still modifies the coordinated operation of the chain-link converters 28 by limiting the active and reactive power transfer demands P*, Q* made of the voltage source converter 10.

To that end, the control apparatus 32 includes an evaluation module 40 that is configured to
receive switching module performance information $sm_i$, which typically includes individual switching module voltages, statuses, and health indicators.

The evaluation module 40 is additionally programmed to evaluate the performance information $sm_i$ and thereby establish when the combined performance of the switching modules 30 within each given chain-link converter 28 has become degraded to a predetermined extent.

Figure 2:
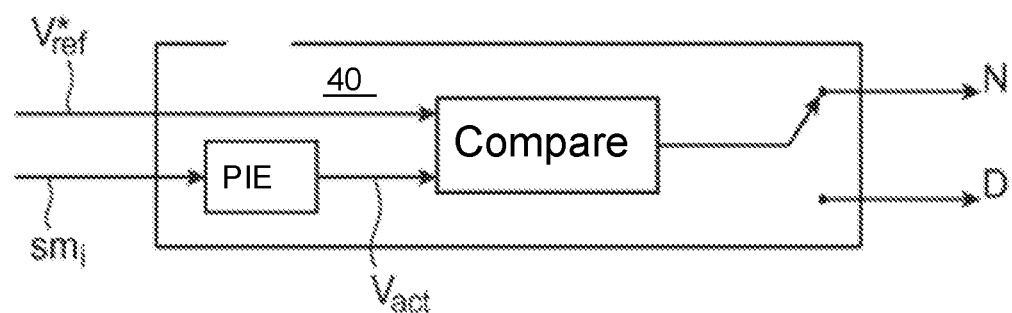
FIG. 2 shows an enlarged, schematic view of a Performance Information Evaluator (PIE) module which forms a part of the voltage source converter shown in FIG. 1.

More particularly, the evaluation module 40 is programmed, as shown in FIG. 2, to evaluate the performance information $sm_i$ for the switching modules 30 within a given chain-link converter 28 by comparing the respective chain-link reference voltage $v^*_{ref}$ the given chain-link converter 28 is required to produce with the actual stepped variable voltage source $v_{act}$ provided by the said given chain-link converter 28.

Thereafter, the evaluation module 40 establishes that the combined performance of the switching modules 30 within the given chain-link converter 28 has become degraded to a predetermined extent when the actual stepped variable voltage source $v_{act}$ provided falls short of the corresponding chain-link reference voltage $v^*_{ref}$ by more than a predetermined amount.

By way of example, the predetermined amount is typically 3%, i.e. the evaluation module 40 establishes that the combined performance of the switching modules 30 within the given chain-link converter 28 has become degraded to a predetermined extent when the peak value of the actual stepped variable voltage source $v_{act}$ is less than or equal to 97% of the peak value of the corresponding chain-link reference voltage $v^*_{ref}$.

Once the evaluation module 40 has established that the combined performance of the switching modules 30 within a given chain-link converter 28 has become degraded to a predetermined extent, the evaluation module 40 is still further programmed to instruct the high-level controller 34 to modify the coordinated operation of the chain-link converters 28.

More particularly, the evaluation module 40 is further programmed, as illustrated schematically in FIG. 2, to instruct the high-level controller 34 to switch from operating the voltage source converter 10 in a normal mode N, to operate the voltage source converter 10 in a degraded mode D. When operating the voltage source converter 10 in the degraded mode D, the high-level controller 34 limits the active and reactive power transfer demands P*, Q* made of the voltage source converter 10.

Figure 3:
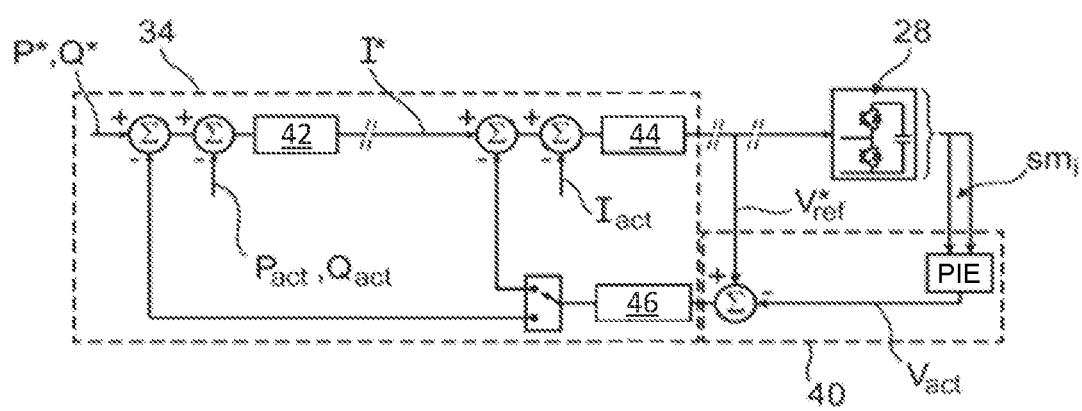
FIG. 3 shows an example of how a high-level controller which forms a part of the voltage source converter shown in FIG. 1 may be programmed to modify the operation of the said voltage source converter.

One way in which the high-level controller 34 may limit the active and reactive power transfer demands P*, Q* made of the voltage source converter 10 is illustrated, by way of example, in FIG. 3.

Following a comparison of the active and reactive power transfer demands P*, Q* with the actual active and reactive power $P_{act}$, $Q_{act}$ being transferred, a first regulator 42 establishes a current reference I* which, following a comparison with the actual current being produced $I_{act}$, is processed by a second regulator 44 to establish the corresponding chain-link reference voltage $v^*_{ref}$, which the associated low-level controller 38 controls the corresponding chain-link converter 28 to produce.

As described above, the evaluation module 40 compares the respective chain-link reference voltage $v^*_{ref}$ the corresponding chain-link converter 28 is required to produce with the actual stepped variable voltage source $v_{act}$ provided by the said corresponding chain-link converter 28, and the output of the evaluation module 40 acts, as necessary, through a compensator 46 within the high-level controller 34 to either:

reduce the active real and reactive power transfer demand P*, Q*; or
reduce the current reference demand I* resulting from the active and reactive power transfer demand P*, Q*.

The invention claimed is:

1. A voltage source converter comprising:
first and second DC terminals for connecting to a DC network;
at least one converter limb, the at least one converter limb extending between the first and second DC terminals and including first and second limb portions separated by a respective AC terminal for connection to a corresponding phase of an AC network, the first limb portion extending between the first DC terminal and corresponding AC terminal, the second limb portion extending between the second DC terminal and corresponding AC terminal, the first and second limb portions each including a respective chain-link converter defined by a plurality of series-connected switching modules configured to provide a stepped variable voltage source; and
a control apparatus configured to coordinate operation of the respective chain-link converters to cause an exchange of power between the DC and AC networks, the control apparatus evaluating a performance of one of the plurality of series-connected switching modules and modifying the operation of the respective chain-link converters when the performance of the one of the plurality of series-connected switching modules becomes degraded to a predetermined amount by varying active and reactive power transfer demands made of the voltage source converter;
wherein the control apparatus comprises:
a high-level controller configured to receive the active and reactive power transfer demands, and to establish a respective chain-link reference voltage for each of the respective chain-link converters that each of the respective chain-link converters is required to produce in order to cause the exchange of power between the DC and AC networks;
at least one low-level controller configured to control the operation of the plurality of series-connected switching modules, whereby each of the respective chain-link converters is configured to provide the stepped variable voltage source equal to the respective chain-link reference voltage; and
an evaluation module configured to receive performance information from the plurality of series-connected switching modules and configured to evaluate the performance information to determine when the performance of the one of the plurality of series-connected switching modules has become degraded to the predetermined amount.

2. The voltage source converter according to claim 1, wherein the control apparatus modifies the operation of the respective chain-link converters by limiting the active and reactive power transfer demands made of the voltage source converter.

3. The voltage source converter according to claim 1, wherein the evaluation module is configured to instruct the high-level controller to modify the operation of the respective chain-link converters when the performance of the one of the plurality of series-connected switching modules has become degraded to the predetermined amount.

4. The voltage source converter according to claim 3, wherein the evaluation module is configured to instruct the high-level controller to operate the voltage source converter in a degraded mode in which the high-level controller limits the active and reactive power transfer demands made of the voltage source converter to modify the operation of the respective chain-link converters.

5. The voltage source converter according to claim 4, wherein the high-level controller limits the active and reactive power transfer demands by one of:
reducing the active and reactive power transfer demands; and
reducing a current reference demand resulting from the active and reactive power transfer demands.

6. The voltage source converter according to claim 1, wherein the evaluation module is configured to evaluate the performance information by comparing the respective chain-link reference voltage with the stepped variable voltage source, and to determine that the performance of the one of the plurality of series-connected switching modules has become degraded to the predetermined amount when the stepped variable voltage source is less than the respective chain-link reference voltage by more than a predetermined percentage.

7. A method of operating a voltage source converter, the voltage source converter comprising:
first and second DC terminals for connecting to a DC network;
at least one converter limb, the at least one converter limb extending between the first and second DC terminals and including first and second limb portions separated by a respective AC terminal for connection to a corresponding phase of an AC network, the first limb portion extending between the first DC terminal and corresponding AC terminal, the second limb portion extending between the second DC terminal and corresponding AC terminal, the first and second limb portions each including a respective chain-link converter defined by a plurality of series-connected switching modules configured to provide a stepped variable voltage source,
wherein the method comprises:
coordinating operation of the respective chain-link converters to cause an exchange of power between the DC and AC networks;
evaluating a performance of one of the plurality of series-connected switching modules;
modifying the operation of the respective chain-link converters when the performance of the one of the plurality of series-connected switching modules becomes degraded to a predetermined amount by varying active and reactive power transfer demands made of the voltage source converter;
receiving the active and reactive power transfer demands;
establishing a respective chain-link reference voltage for each of the respective chain-link converters that each of the respective chain-link converters is required to produce in order to cause the exchange of power between the DC and AC networks;
controlling the operation of the plurality of series-connected switching module, whereby each of the respective chain-link converters is configured to provide the stepped variable voltage source equal to the respective chain-link reference voltage; and
receiving performance information from the plurality of series-connected switching modules and evaluating the performance information to determine when the performance of the one of the plurality of series-connected switching modules has become degraded to the predetermined amount.

8. The method according to claim 7, further comprising:
modifying the operation of the respective chain-link converters by limiting the active and reactive power transfer demands made of the voltage source converter.

9. The method according to claim 7, further comprising:
modifying the operation of the respective chain-link converters when the performance of the one of the plurality of series-connected switching modules has become degraded to the predetermined amount.

10. The method according to claim 9, further comprising:
operating the voltage source converter in a degraded mode in which the active and reactive power transfer demands made of the voltage source converter are limited to modify the operation of the respective chain-link converter, wherein the method further includes limiting the active and reactive power transfer demands by one of:
reducing the active and reactive power transfer demands; and
reducing a current reference demand resulting from the active and reactive power transfer demands.

11. The method according to claim 7, further comprising:
evaluating the performance information by comparing the respective chain-link reference voltage with the stepped variable voltage source, and determining that the performance of the one of the plurality of series-connected switching modules has become degraded to the predetermined amount when the stepped variable voltage source is less than the respective chain-link reference voltage by more than a predetermined percentage.

* * * * *